United States Patent
Pettovello

(10) Patent No.: US 7,664,742 B2
(45) Date of Patent: Feb. 16, 2010

(54) INDEX DATA STRUCTURE FOR A PEER-TO-PEER NETWORK

(76) Inventor: Primo M. Pettovello, 45121 Patrick, Canton, MI (US) 48187-2552

( * ) Notice: Subject to any disclaimer, the term of this patent is extended or adjusted under 35 U.S.C. 154(b) by 111 days.

(21) Appl. No.: 11/559,887

(22) Filed: Nov. 14, 2006

(65) Prior Publication Data

US 2007/0112803 A1    May 17, 2007

Related U.S. Application Data

(60) Provisional application No. 60/736,550, filed on Nov. 14, 2005.

(51) Int. Cl.
*G06F 17/30* (2006.01)
*G06F 17/00* (2006.01)

(52) U.S. Cl. ........................ 707/3; 707/104.1

(58) Field of Classification Search ............... None
See application file for complete search history.

(56) References Cited

U.S. PATENT DOCUMENTS

| | | | |
|---|---|---|---|
| 5,657,241 A | 8/1997 | Butts et al. | |
| 5,737,732 A | 4/1998 | Gibson et al. | |
| 5,987,449 A | 11/1999 | Suciu | |
| 5,999,926 A | 12/1999 | Suciu | |
| 6,505,205 B1 | 1/2003 | Kothuri et al. | |
| 6,675,160 B2 | 1/2004 | Hara et al. | |
| 6,772,165 B2 | 8/2004 | O'Carroll | |
| 6,804,677 B2 | 10/2004 | Shadmon et al. | |
| 6,871,204 B2 | 3/2005 | Krishnaprasad et al. | |
| 6,901,410 B2 | 5/2005 | Marron et al. | |
| 6,904,454 B2 | 6/2005 | Stickler | |
| 7,062,507 B2 | 6/2006 | Wang et al. | |
| 2001/0039570 A1 | 11/2001 | Stewart et al. | |
| 2002/0010741 A1 | 1/2002 | Stewart et al. | |
| 2002/0013759 A1 | 1/2002 | Stewart et al. | |
| 2002/0019797 A1 | 2/2002 | Stewart et al. | |
| 2002/0054090 A1 | 5/2002 | Silva et al. | |
| 2002/0078094 A1 | 6/2002 | Krishnaprasad et al. | |
| 2002/0091539 A1 | 7/2002 | Yin et al. | |
| 2002/0091579 A1 | 7/2002 | Yehia et al. | |
| 2002/0091614 A1 | 7/2002 | Yehia et al. | |
| 2002/0099687 A1 | 7/2002 | Krishnaprasad et al. | |
| 2002/0107973 A1 | 8/2002 | Lennon et al. | |
| 2002/0120685 A1 | 8/2002 | Srivastava et al. | |
| 2002/0129000 A1 | 9/2002 | Pillai et al. | |
| 2002/0133497 A1 | 9/2002 | Draper et al. | |
| 2002/0138582 A1 | 9/2002 | Chandra et al. | |

(Continued)

OTHER PUBLICATIONS

Horowitz, E. et al., "Fundamentals of Data Structures in C++," Computer Science Press, 1995 (1 pg.).

(Continued)

*Primary Examiner*—Uyen T. Le
(74) *Attorney, Agent, or Firm*—Brooks Kushman P.C.

(57) ABSTRACT

An index data structure has a plurality of index keys for uniquely identifying potential data object context nodes. Each index key is, in turn, associated with one or more potential context nodes. Moreover, the index key has a label that provides semantic content to a user. The index data structure further includes one or more routing tables associated with each index key that generally include a plurality of path references.

12 Claims, 10 Drawing Sheets

U.S. PATENT DOCUMENTS

| | | |
|---|---|---|
| 2002/0147726 A1 | 10/2002 | Yehia et al. |
| 2002/0152267 A1 | 10/2002 | Lennon |
| 2002/0156693 A1 | 10/2002 | Stewart et al. |
| 2002/0161688 A1 | 10/2002 | Stewart et al. |
| 2002/0161801 A1 | 10/2002 | Hind et al. |
| 2002/0170070 A1 | 11/2002 | Rising, III et al. |
| 2002/0174147 A1 | 11/2002 | Wang et al. |
| 2002/0198905 A1 | 12/2002 | Tabatabai et al. |
| 2003/0018607 A1 | 1/2003 | Lennon et al. |
| 2003/0018668 A1 | 1/2003 | Britton et al. |
| 2003/0028557 A1 | 2/2003 | Walker et al. |
| 2003/0041065 A1 | 2/2003 | Lucovsky et al. |
| 2003/0041076 A1 | 2/2003 | Lucovsky et al. |
| 2003/0046317 A1 | 3/2003 | Gseri et al. |
| 2003/0050911 A1 | 3/2003 | Lucovsky et al. |
| 2003/0061229 A1 | 3/2003 | Lusen et al. |
| 2003/0065874 A1 | 4/2003 | Marron et al. |
| 2003/0069881 A1 | 4/2003 | Huttunen |
| 2003/0069887 A1 | 4/2003 | Lucovsky et al. |
| 2003/0070158 A1 | 4/2003 | Lucas et al. |
| 2003/0074352 A1 | 4/2003 | Raboczi et al. |
| 2003/0084180 A1 | 5/2003 | Azami |
| 2003/0088573 A1 | 5/2003 | Stickler |
| 2003/0088593 A1 | 5/2003 | Stickler |
| 2003/0093434 A1 | 5/2003 | Stickler |
| 2003/0093755 A1 | 5/2003 | O'Carroll |
| 2003/0097365 A1 | 5/2003 | Stickler |
| 2003/0097485 A1 | 5/2003 | Horvitz et al. |
| 2003/0101190 A1 | 5/2003 | Horvitz et al. |
| 2003/0105746 A1 | 6/2003 | Stickler |
| 2003/0110442 A1 | 6/2003 | Battle |
| 2003/0115228 A1 | 6/2003 | Horvitz et al. |
| 2003/0120978 A1 | 6/2003 | Fabbrizio et al. |
| 2003/0125929 A1 | 7/2003 | Bergstraesser et al. |
| 2003/0131069 A1 | 7/2003 | Lucovsky et al. |
| 2003/0131073 A1 | 7/2003 | Lucovsky et al. |
| 2003/0131142 A1 | 7/2003 | Horvitz et al. |
| 2003/0171962 A1 | 9/2003 | Hirth et al. |
| 2003/0172007 A1 | 9/2003 | Helmolt et al. |
| 2003/0172196 A1 | 9/2003 | Hejlsberg et al. |
| 2003/0193994 A1 | 10/2003 | Stickler |
| 2003/0200502 A1 | 10/2003 | Abe et al. |
| 2003/0212657 A1 | 11/2003 | Kaluskar et al. |
| 2003/0212664 A1 | 11/2003 | Breining et al. |
| 2003/0225825 A1 | 12/2003 | Healey et al. |
| 2004/0002976 A1 | 1/2004 | Lucovsky |
| 2004/0006563 A1 | 1/2004 | Zwiegincew et al. |
| 2004/0006564 A1 | 1/2004 | Lucovsky et al. |
| 2004/0006590 A1 | 1/2004 | Lucovsky et al. |
| 2004/0010754 A1 | 1/2004 | Jones |
| 2004/0015783 A1 | 1/2004 | Lennon et al. |
| 2004/0024875 A1 | 2/2004 | Horvitz et al. |
| 2004/0028212 A1 | 2/2004 | Lok et al. |
| 2004/0034830 A1 | 2/2004 | Fuchs et al. |
| 2004/0039734 A1 | 2/2004 | Judd et al. |
| 2004/0044659 A1 | 3/2004 | Judd et al. |
| 2004/0044680 A1 | 3/2004 | Thorpe et al. |
| 2004/0044961 A1 | 3/2004 | Pesenson |
| 2004/0044965 A1 | 3/2004 | Toyama et al. |
| 2004/0044990 A1 | 3/2004 | Schloegel et al. |
| 2004/0046789 A1 | 3/2004 | Inanoria |
| 2004/0060002 A1 | 3/2004 | Lucovsky et al. |
| 2004/0060006 A1 | 3/2004 | Lindblad et al. |
| 2004/0060007 A1 | 3/2004 | Gottlob et al. |
| 2004/0064466 A1 | 4/2004 | Manikutty et al. |
| 2004/0073541 A1 | 4/2004 | Lindblad et al. |
| 2004/0088320 A1 | 5/2004 | Perry |
| 2004/0098384 A1 | 5/2004 | Min et al. |
| 2004/0098667 A1 | 5/2004 | Atkinson |
| 2004/0103091 A1 | 5/2004 | Lindblad et al. |
| 2004/0103105 A1 | 5/2004 | Lindblad et al. |
| 2004/0111396 A1 | 6/2004 | Musayev et al. |
| 2004/0117439 A1 | 6/2004 | Levett et al. |
| 2004/0122844 A1 | 6/2004 | Malloy et al. |
| 2004/0126094 A1 | 7/2004 | Kotani |
| 2004/0148213 A1 | 7/2004 | Aziz et al. |
| 2004/0148214 A1 | 7/2004 | Aziz et al. |
| 2004/0148299 A1 | 7/2004 | Teegan et al. |
| 2004/0148375 A1 | 7/2004 | Levett et al. |
| 2004/0153871 A1 | 8/2004 | Pietschker et al. |
| 2004/0163041 A1 | 8/2004 | Engel |
| 2004/0181511 A1* | 9/2004 | Xu et al. ......................... 707/3 |
| 2004/0181543 A1 | 9/2004 | Wu et al. |
| 2004/0199861 A1 | 10/2004 | Lucovsky |
| 2004/0199869 A1 | 10/2004 | Lucovsky et al. |
| 2004/0205082 A1 | 10/2004 | Fontoura et al. |
| 2004/0205577 A1 | 10/2004 | Abe et al. |
| 2004/0205605 A1 | 10/2004 | Adler et al. |
| 2004/0210573 A1 | 10/2004 | Abe et al. |
| 2004/0210839 A1 | 10/2004 | Lucovsky |
| 2004/0215600 A1 | 10/2004 | Aridor et al. |
| 2004/0220895 A1 | 11/2004 | Carus et al. |
| 2004/0221229 A1 | 11/2004 | Perry |
| 2004/0230602 A1 | 11/2004 | Duddington |
| 2004/0230674 A1 | 11/2004 | Pourheidari et al. |
| 2004/0230943 A1 | 11/2004 | Pourheidari et al. |
| 2004/0243931 A1 | 12/2004 | Stevens et al. |
| 2004/0249844 A1 | 12/2004 | Kotani |
| 2004/0260685 A1 | 12/2004 | Pfleiger et al. |
| 2004/0261019 A1 | 12/2004 | Imamura et al. |
| 2004/0267747 A1 | 12/2004 | Choi et al. |
| 2004/0267760 A1 | 12/2004 | Brundage et al. |
| 2004/0267876 A1 | 12/2004 | Kakivaya et al. |
| 2004/0268236 A1 | 12/2004 | Chidlovskii et al. |
| 2005/0004892 A1 | 1/2005 | Brundage et al. |
| 2005/0015797 A1 | 1/2005 | Noblecourt et al. |
| 2005/0021512 A1 | 1/2005 | Koenig |
| 2005/0021838 A1 | 1/2005 | Levett |
| 2005/0022115 A1 | 1/2005 | Baumgartner et al. |
| 2005/0038785 A1 | 2/2005 | Agrawal et al. |
| 2005/0039119 A1 | 2/2005 | Parks et al. |
| 2005/0050068 A1 | 3/2005 | Vaschillo et al. |
| 2005/0055358 A1 | 3/2005 | Krishnaprasad et al. |
| 2005/0055365 A1 | 3/2005 | Ramakrishnan et al. |
| 2005/0060252 A1 | 3/2005 | Doddington |
| 2005/0060647 A1 | 3/2005 | Doan et al. |
| 2005/0065949 A1 | 3/2005 | Warner et al. |
| 2005/0091093 A1 | 4/2005 | Bhaskaran et al. |
| 2005/0091424 A1 | 4/2005 | Snover et al. |
| 2005/0097084 A1 | 5/2005 | Balmin et al. |
| 2005/0102256 A1 | 5/2005 | Bordawedar et al. |
| 2005/0108203 A1* | 5/2005 | Tang et al. ..................... 707/3 |
| 2005/0108630 A1 | 5/2005 | Wasson et al. |
| 2005/0228792 A1 | 10/2005 | Chandrasekaran |
| 2005/0257201 A1 | 11/2005 | Rose et al. |
| 2006/0031233 A1 | 2/2006 | Liu et al. |
| 2006/0064432 A1 | 3/2006 | Pettovello |
| 2007/0118547 A1 | 5/2007 | Gupta et al. |

OTHER PUBLICATIONS

Deshpande, A. et al., "Cache-and-Query for Wide Area Sensor Databases," SIGMOD 2003, Jun. 9-12, 2003, San Diego, CA, pp. 503-514.

Bonifati, A., et al., "XPath Lookup Queries in P2P Networks," WIDM '04, Nov. 12-13, 2004, Washington, DC, pp. 48-55.

Aspnes, J. et al., "Skip Graphs," Dept. Of Computer Science, Yale University, pp. 384-393.

Jagadish, H.V. et al., "VBI-Tree: A Peer-to-Peer Framework for Supporting Multi-Dimensional Indexing Schemes," Proceedings of the 22nd Int'l Conf. on Data Engineering (ICDE '06), 10 pgs.

Tanenbaum, A., "Distributed File System Design," Distributed Operating Systems, Prentice-Hall Chapter 5—Distributed File Systems, Library of Congress 1995, p. 249.

Sinha, P.K., "Distributed Operating Systems—Concepts and Design," IEEE Computer Science Press, IEEE Press, NY, Chapter 10 Naming, 1997, p. 534.

Pugh, W., "Skip Lists: A Probabilistic Alternative to Balanced Trees," Communications of the ACM, Jun. 1990, v. 33, N. 6, pp. 668-676.

Jagadish, H.V. et al., "Baton: A Balanced Tree Structure for Peer-to-Peer Networks," Proceedings of the 31st VLDB Conference, Trondheim, Norway, 2005, pp. 661-672.

Manku, et al., "Know they Neighbor's Neighbor: the Power of Lookahead in Randomized P2P Networks," STOC '04, Jun. 13-15-, 2004, Chicago, IL, pp. 54-63.

Ooi, Beng Chin et al., "Index Nesting—an Efficient approach to indexing in object-oriented databases," The VLDB Journal, 1996, pp. 215-228.

Al-Khalifa, Shurug, "Structural Joins: A Primitive for Efficient XML Query Pattern Matching," Proceedings of the 18th International Conference on Data Engineering (ICDE '02), 2002, 12 pages.

Bruno, Nicolas et al., "Navigation- vs. Index-Based XML Multi-Query Processing," Proceedings of the 19th International Conference on Data Engineering (ICDE'03), pp. 139-150.

Comer, Douglas, "The Ubiquitous B-Tree," Computing Surveys, v. 11., n. 2, pp. 121-137, Jun. 1979.

Cooper, Brian F. et al., "A Fast Index for Semistructured Data," Proceedings of the 27th VLDB Conference, Roma, Italy, 2001, 10 pages.

Cormen, Thomas H., "Introduction to Algorithms," MIT Press 1995, p. 215.

Fiebig, Thorsten et al., "Anatomy of a native XML base management system," The VLDB Journal (2002), 11:293-314.

Grust, Torsten, "Accelerating XPath Location Steps," ACM SIGMOD 2002, Jun. 4-6, 2002, Madison, WI, pp. 109-120.

Haerder, Theo, "Implementing a Generalized Access Path Structure for a Relational Database System," ACM Transactions on Database Systems, v. 3, n. 3, Sep. 1978, pp. 285-298.

Hidders, Jan et al., "Efficient XPath Axis Evaluation for DOM Data Structures," pp. 1-10.

Kaushik, Raghav et al., "Covering Indexes for Branching Path Queries," ACM SIGMOD, Madison, WI, Jun. 4-6, 2002, pp. 133-144.

Kaushik, Raghav et al., "On the Integration of Structure Indexes and Inverted Lists," SIGMOD 2004, Jun. 13-18, 2004, Paris, France, 12 pages.

Krishnamurthy, Rajasekar et al., "XML-to-SQL Query Translation Literature: The State of the Art and Open Problems," 17 pages.

Li, Hanyu et al., "An Evaluation of XML Indexes for Structural Join," SIGMOD Record, v. 33, n. 3, Sep. 2004, pp. 28-33.

Li, Quanzhong et al., "Indexing and Querying XML Data for Regular Path Expressions," Proceedings of the 27th VLDB Conference, Roma, Italy, 2001, pp. 361-370.

Mathis, Christian et al., "Locking-Aware Structural Join Operators for XML Query Processing," SIGMOD 2006, Jun. 27-29, 2006, Chicago, IL, pp. 467-478.

Mehta, Dinesh et al., "Handbook of Data Structures and Applications," 1 page.

Mullins, Judy et al., "An Integrated Data Structure with Multiple Access Paths for Database Systems," Computer Science Telecommunications, pp. 57-64, 1992.

Oracle, "Oracle9i Index-Organized Tables Technical Whitepaper—An Oracle White Paper", Sep. 2001, pp. 1-11.

Oracle, "Technical Comparison of Oracle Database vs. IBM DB2 UDB: Focus on Performance—An Oracle White Paper," May 2005, pp. 1-23.

Rys, Michael et al., "XML and Relational Database Management Systems: the Inside Story," pp. 945-947.

Rys, Michael, "XML and Relational Database Management Systems: Inside Microsoft® SQL Server™ 2005," SIGMOD 2005, Jun. 14-15, 2005, Baltimore, MD, pp. 958-962.

Seeger, Bernhard et al., "Multi-Disk B-trees," 1991 ACM, pp. 436-445.

Shui, William M. et al., "Querying and Maintaining ordered XML Data Using Relational Databases," copyright 2005, pp. 85-94.

Tatarinov, Igor et al., "Storing and Querying Ordered XML Using a Relational Database System," ACM SIGMOD 2002, Jun. 4-6, 2002, Madison, WI, pp. 204-215.

Wang, Fusheng et al., "Bridging Relational Database History and the Web: the XML Approach," WIDM '06, Nov. 10, 2006, Arlington, VA, pp. 3-10.

Yang, Beverly et al., "Virtual Cursors for XML Joins," CIKM '04, Nov. 8-13, 2004, Washington, DC, pp. 523-532.

Zhang, Guogen, "Building a Scalable Native XML Database Engine on Infrastructure for a Relational Database," XIME-P 2005, Jun. 16-7, 2005, Baltimore, MD, 8 pages.

* cited by examiner

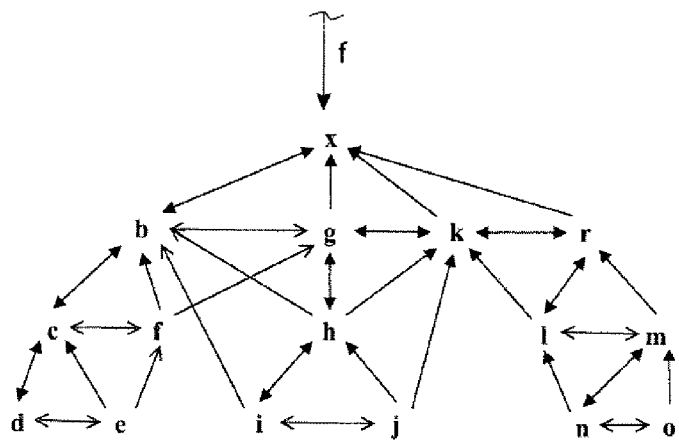

The Routing Tables Now Are:
X's Descendant RT [1] is /X/B
X's Descendant RT [2] is /X/G
X's Descendant RT [3] is /X/K
X's Descendant RT [4] is /X/R
B's Ancestor RT[1] is /X
B's Descendant RT [1] is /X/C
B's Descendant RT [2] is /X/F
B's Following RT [1] is /X/G
B's Following RT [2] is /X/K
C's Ancestor RT[1] is /X/B
C's Ancestor RT[2] is /X
C's Following RT[1] is /X/B/F
C's Following RT[2] is /X/B/G
C's Following RT[3] is /X/B/R
C's Descendant RT[1] is /X/B/C/D
C's Descendant RT[1] is /X/B/C/E
D's Ancestor RT[1] is /X/B/C
D's Ancestor RT[2] is /X/B
D's Ancestor RT[3] is /X
D's Following RT [1] is /X/B/F/E
D's Following RT [2] is /X/B/F
D's Following RT [3] is /X/K
E's Ancestor RT[1] is /X/B/F
E's Ancestor RT[2] is /X/B
E's Ancestor RT[3] is /X
E's Following RT [1] is /X/B/F
E's Following RT [2] is /X/G
E's Following RT [3] is /X/R
F's Ancestor RT[1] is /X/B
F's Ancestor RT[2] is /X
F's Preceding RT [1] is /X/B/C
F's Following RT[[1] is /X/G
F's Following RT [2] is /X/K
G's Ancestor RT [1] is /X
G's Preceding RT[1] is /X/B
G's Following RT[1] is /X/K
G's Following RT[2] is /X/R
G's Descendant RT[1] is /X/G/H
I's Ancestor RT[1] is /X/G/H
I's Ancestor RT[2] is /X/G
I's Ancestor RT[3] is /X
I's Preceding RT[1] Is /X/B I's Following RT[1] is /X/G/H/J
I's Following RT[2] is /X/K
J's Ancestor RT[1] is /X/G/H
J's Ancestor RT[2] is /X/G
J's Ancestor RT[3] is /X
J's Preceding RT[1] Is /X/G/H/I
J's Preceding RT[2] Is /X/B
J's Following RT[1] is /X/K
J's Following RT[2] is /X/R
K's Ancestor RT[1] is /X
K's Preceding RT[1] is /X/G
K's Preceding RT[2] is /X/B
K's Following RT[1] is /X/R
R's Ancestor RT[1] is /X
R's Preceding RT[1] is /X/K
R's Preceding RT[2] is /X/G
R's Descendant RT[1] is /X/R/L
R's Descendant RT[2] is /X/R/M
L's Ancestor RT[1] is /X/R
L's Preceding RT[1] is /X/K
L's Preceding RT[2] is /X/G
L's Following RT[1] is /X/R/M
M's Ancestor RT[1] is /X/R
M's Ancestor RT[2] is /X
M's Preceding RT[1] is /X/K/L
M's Preceding RT[2] is /X/K
M's Preceding RT[3] is /X/B
M's Descendant RT[1] is /X/R/M/N
M's Descendant RT[1] is /X/R/M/O
N's Ancestor RT[1] is /X/R/M
N's Ancestor RT[2] is /X/R
N's Ancestor RT[3] is /X
N's Preceding RT[1] is /X/K/L
N's Preceding RT[2] is /X/K
N's Preceding RT[3] is /X/B
N's Following RT[1] is /X/R/M/O
O's Ancestor RT[1] is /X/R/M
O's Ancestor RT[2] is /X/R
O's Ancestor RT[3] is /X
O's Preceding RT[1] is /X/K/L/N
O's Preceding RT[2] is /X/K/L
O's Preceding RT[3] is /X/G

Fig. 9C

INDEX DATA STRUCTURE FOR A PEER-TO-PEER NETWORK

CROSS-REFERENCE TO RELATED APPLICATIONS

This application claims the benefit of U.S. provisional application Ser. No. 60/736,550 filed Nov. 14, 2005, the entire disclosure of which is hereby incorporated.

BACKGROUND OF THE INVENTION

1. Field of the Invention

The present invention relates to index data structures, in particular useful in indexing data objects relating to distributed peer-to-pear network systems.

2. Background Art

Finding semantically relevant information and searching dynamic content in the Internet today is still a challenging problem, even with the comprehensive coverage of exposed static content provided by centralized information retrieval search engines such as the fantastically successful Google, Yahoo and MSN Search. Search engines attempt to assign significance to information, such as with reverse page link counting, but the semantic indexing capabilities and thus intelligent query, in general, is limited to information retrieval, IR, keyword matches over cached copies of static information. These popular search engines use a client-server model. Other client-server centralized systems include Kazaa and Gnutella.

In contrast, in peer-to-peer ("P2P") systems each node participates as both a client and server simultaneously. About 72 percent of the traffic on the Internet is peer-to-peer. Furthermore, the number of endpoints will continue to grow, perhaps into the trillions for sensors alone, and the money and creativity is still at the edge of the network. The P2P model is antithetical to the top-down structure client server mode. The goal of P2P systems is to share information in a large-scale distributed environment without centralized coordination or structure. Furthermore, P2P nodes have no availability guarantees. Nodes are constantly joining and leaving the network. Therefore, substantial redundancy is needed to maintain network connectivity.

Dynamic content indexing, sometimes referred to as "deep-content", is not done well, if at all, by client-server search engines. One approach to dynamic content indexing, using registry technology, is provided in the Web Services architecture with UDDI. UDDI is a centralized registry database that provides descriptions of available Web Services. The centralized "phone book" approach of UDDI is conceptually and architecturally inconsistent with distributed P2P goals, and has experienced limited success outside of the enterprise.

Some progress has been made in adapting XPath to P2P networks using Distributed Hash Tables ("DHT"). The problem with DHT is that range queries aren't supported, as the precise object name must be known in advance. XPath queries that use structure or predicate range filters on node sequences and node sets do not work with hash structures. Other proposed index structures are unsuitable for broad based deployment. Support for complex P2P queries is generally lacking.

Accordingly, there is a need for a generic and extensible distributed database architecture that can support complex queries and semantically index disparate information, both structured and unstructured, including static documents and dynamic content such as online web services and real time sensor networks.

SUMMARY OF THE INVENTION

In at least one embodiment, the present invention solve one or more problems of the prior art by providing an index data structure usable for finding information in a peer-to-peer environment. The present embodiment extends the MTree, data structure provided in U.S. patent application Ser. No. 11/233,869 filed on Sep. 22, 2005. The entire disclosure of this application is hereby incorporated by reference. MTree as set forth in that patent application is an XPath navigational index useable to index XML documents. The present embodiment, refers to as MTreeP2P, extends MTree to become a content-addressable distributed P2P semantic index that is the underpinning for indexing and querying disparate distributed content. The index data structure of the present embodiment comprises a plurality of index keys for uniquely identifying potential context nodes associated with one or more data objects. Each index key is, in turn, associated with one or more potential context nodes. Moreover, the index key has a label that provides semantic content to a user. The MTreeP2P data structure further comprises one or more routing tables associated with each index key. In general, the one or more routing tables comprising a plurality of path references. Advantageously, the present embodiment allows XPath to be used as a P2P query language. The modifications to MTree exploit and extend the design features enabled by the MTree axis threads, especially the following and preceding axis threads. By extending the axis references on each node to contain multiple references about the neighbor's out neighborhoods, axis can be used for routing and for complex query resolution. Furthermore, by creating hierarchical paths that contain semantically meaningful information, essentially variants of topic maps, knowledge can be represented in the index and queried directly. The present embodiment provides a semantically integrated, distributed indexing system.

MTreeP2P allows for semantic indexing of disparate data objects enabling the sharing of collaborative intelligence and the reuse of collective intelligence. This is achieved, in part, by allowing for multiple semantic paths with varying lengths to the same or different nodes to coexist. The obvious preference is to define nodes using precisely agreed upon canonical entity names placed into a precisely defined hierarchical schema, given a confidence interval and support threshold, but in practice widespread agreement is not always possible. Since many words are homonyms, a single word alone cannot provide enough semantic contextual information to support a unique concepts but a sequence of words organized in a path of sufficient length can uniquely define an ontological concept. MTreeP2P enables multiple ontological mappings to reside side-by-side by allowing multiple paths through the same node, such that, the mediation technology is removed and the tasks for mediation are assigned back to the end points by mapping the end-point to the MTreeP2P index.

Another advantage of MTreeP2P is that disparate data objects are mapped and integrated into an internet wide unifying semantic index structure that can be queried using a standard query language such as XPath or XQuery. This approach is in contrast to the current state of the art where special purpose query tools, applications, databases and indexes are constructed for each type of technology. The ad-hoc structure of the semantic paths allows efficient mapping of disparate objects into a dynamically changing structure, while still responding to queries in a meaningful way.

Using a semantic index allows a question to be posed to the index with semantically meaningful linguistic terms rather than use of query languages that require knowledge of the underlying physical data base structure, such as when SQL join queries are constructed on relational tables.

MTreeP2P allows humans and devices to query the index for the information desired instead of building unique logic in program code that is specific to each disparate data object, which is the typical method used to develop interfaces. Therefore, the advantage of MTreeP2P is that disparate data objects need to build their interfaces once to conform to the extended XPath/XQuery semantics to enable efficient access from many other technologies.

BRIEF DESCRIPTION OF THE DRAWINGS

FIG. 9C is a continuation of FIG. 9B;

DETAILED DESCRIPTION OF THE PREFERRED EMBODIMENT(S)

Figure 1:
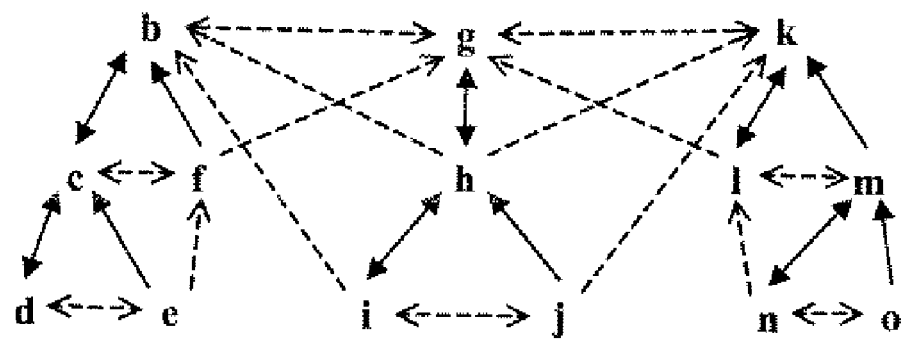
FIG. 1 is MTreeP2P graph showing an overlay of $f_{p2p}$-graph, $p_{p2p}$-graph, $a_{p2p}$-graph, and $d_{p2p}$-graph.

Reference will now be made in detail to the presently preferred compositions or embodiments and methods of the invention, which constitute the best modes of practicing the invention presently known to the inventors.

The term "tree" or "tree structure" means a type of data structure in which each element node is attached to one or more element nodes directly beneath it. The connections between element nodes are often called branches.

The term "tree traversal" means a technique for processing the nodes of a tree in some order. Systematically following the edges of the graph so as to visit the vertices of the graph.

The term "data object" refers to disparate computing accessible components, examples including but not limited to, an MTree index, a collection of MTree indexes, XML document fragment, collection of XML document fragments, XML document(s), RDF files, music files, movie files, multimedia files, collection of XML documents, a computer system, a collection of distribute computer systems, a distributed web service, a collection of distributed web services, a sensor, a collection of sensors, a cell phone, a collection of cell phones, a wireless connection computer, a collection of wireless connected computers, a data acquisition instrument, a collection of data acquisition instruments, a robot, a collection of robots, a collection of distributed services, hierarchical file systems, XML file systems, Linux file systems, Unix file systems, Windows file systems, relational database systems, relational tables, multidimensional data warehouses, computer graphics geometry space, multidimensional data structure, polygon space, and combinations thereof.

The term "distributed service" means a software-callable component on a remote network connected computer.

The term "hierarchical file system" refers a file system in which directories, files and other objects are organized in a tree structure.

As used herein, a path is denoted by formula I:

$$P_\alpha^d(\{c\}) \qquad\qquad I$$

wherein $\alpha$=the axis graph label {a (ancestor), d (descendent), f (following), p (preceding)} P path, c is the context node, and d is the distance count on the axis path from the current context node. When d=* then all vertices on the axis path are included. For MTree axis graphs of, the out-degree for each vertex is one.

A "following path" ("f-path") refers to the set of the nodes of P* connected in semantic order starting at the context node where c is a context node and P* is the out-path of the set of f-subtree root vertices for c. A vertex v is an f-subtree root vertex such that v and all the descendents of v are contained within the following axis set of some context node c. For example, the following out-path $P_f^*(\{d\})=\{e, f, g, k\}$. The following out-path $P_f^{+1}(\{d\})=\{e\}$. The following out-path $P_f^{+2}(\{d\})=\{f\}$. The following out-path $P_f^{+3}(\{d\})=\{g\}$. The following out-path $P_f^{+4}(\{d\})=\{k\}$. The following out-path $P_f^{+5}(\{d\})=\{\ \}$. Therefore, the vertices in the following axis set are the set of f-subtree root vertices and their set of descendent vertices located on the P* f-path, denoted $P_f^*$, relative to the context vertex c on graph D.

A "following skip-path" ("f-skip-path") refers to the set of the nodes of P* connected in semantic order starting at the context node, some of which are directly reachable from c, that are not directly reachable from c in a f-path where P* is the out-path of the set of f-subtree root vertices for c. For example, the following out-path $P_f^*(\{d\})=\{e, f, g, k\}$. The following out-skip-path $S_f^{+2}(\{d\})=\{f\}$. The following out-skip-path $S_f^{+4}(\{d\})=\{k\}$. The following out-skip-paths are shown as solid lines in FIG. 3.

A "following-axis graph" ("fp2p-graph") refers to the f-subtree root spanning forest on the directed graph D.

A "preceding path" ("p-path") refers to the set of the nodes of P* connected in semantic order starting at the context node where P* is the out path of the set of p-subtree root vertices for c. A vertex v is a p-subtree root vertex, such that v and all descendents of v are contained within the preceding axis set of some context node c. For example, the preceding out-path $P_p^*(\{o\})=\{n, l, g, b\}$. The preceding out-path $P_p^{+1}(\{o\})=\{n\}$. The preceding out-path $P_p^{+2}(\{o\})=\{l\}$. The preceding out-path $P_p^{+3}(\{o\})=\{g\}$. The preceding out-path $P_p^{+4}(\{o\})=\{b\}$. The preceding out-path $P_p^{+5}(\{o\})=\{\ \}$. Therefore, the vertices in the preceding axis set are the set of p-subtree root vertices and their set of descendent vertices located on the P* p-path ("$P_p^*$") relative to the context vertex c on graph D.

A "preceding skip-path" ("p-skip-path") refers to the set of the nodes of P* connected in semantic order starting at the context node, some of which are directly reachable from c, that are not directly reachable from c in a p-path, where P* is the out-path of the set of p-subtree root vertices for c. For example, the preceding out-path $P_p^*(\{o\})=\{n, l, g, b\}$. The preceding out-skip-path $S_p^{+2}(\{o\})=\{l\}$. The preceding out-skip-path $S_p^{+4}(\{o\})=\{b\}$. The preceding out-skip-paths are shown as solid lines in FIG. 5.

A "preceding-axis graph" ("$p_{p2p}$-graph") is the p-subtree root spanning forest on directed graph D.

An "ancestor path" ("a-path") is the set of the nodes of P* connected starting at the context node and ending at a top node where c is a context node and $P_a*$ is the outpath of the set of a-subtree root vertices for context node c. A vertex v is an a-subtree root vertex, such that v and all ancestors of v are contained within the ancestor axis set of some context node c.

An "ancestor-axis graph" ("$a_{p2p}$-graph, is the a-subtree root spanning forest on graph D).

A "descendent path" ("d-path") refers to the set of the nodes of P* connected starting at the context node, descending to each child, and recursively continuing downward for each child encountered until no more children exist where c is a context node and $P_d*$ is the out path of the set of d-subtree root vertices for c. A vertex v is a d-subtree root vertex such that all descendants of v are contained within the descendent axis set of some context node c.

A "descendent-axis graph" ("$d_{p2p}$-graph") refers to the d-subtree root spanning forest on graph D.

The term "node" refers to a unit of reference in a MTreeP2P network data structure. Examples include a vertex in graphs and trees. A node may be weighted or unweighted. If a data structure is a collection of computer systems then a node is a computer system. In MTreeP2P, a node has one or more routing tables, a node has a label and a path, the path the node lives on.

The term "edge" refers to a connection between two vertices of a graph. As for a node, an edge may be weighted or unweighted.

The term "query" means a piece of an input data object that is processible by the methods of the invention. In MTreeP2P, the edge is a reference to another node that exists in a node routing table.

The term "Qname" refers to XML qualified names. The value space of QName is the set of tuples {namespace name, local part}, where namespace name is an any URI and local part is an NCName. The lexical space of QName is the set of strings that match the QName production of [Namespaces in XML].

The term "element node" is the name of a node in a MTreeP2P network. Qname is an example of an element node. The term node, unless specified differently will mean element node.

The term "axis" as used herein refers a list of nodes in MTreeP2P index network in relation to the context node. Example include the ancestor axis, the child axis, the descendent axis, and the like. Collectively an axis is represented by one or more subtrees of a data object.

The term "child axis" refers to an axis that contains the children of the context node.

The term "descendant axis" refers to the axis that contains the descendants of the context node. Accordingly, a descendant is a child or a child of a child and so on.

The term "parent axis" refers to the axis that contains the parent of the context node if it exists.

The term "ancestor axis" refers to the axis that contains the ancestors of the context node; the ancestors of the context node consist of the parent of context node and the parent's parent and so on; thus, the ancestor axis will always include the top node, unless the context node is the top node The term "following axis" refers to an axis that contains all nodes that are after the context node when arranged in semantic order The following axis excludes descendents, ancestors, and preceding.

The term "preceding axis" refers to the axis that contains all nodes that are before the context node when arranged in a declarative order. The preceding axis excludes ancestors, decedents, and following.

The term "topnode" refers to that node that is characterized in having no parent. MTreeP2P permits one or many top nodes.

The term "subtree root node" refers to the distinguished initial or fundamental node of a subtree.

The term "preceding subtree root node" refers to a subtree root node of a preceding axis to a context node.

The term "following subtree root node" refers to a subtree root node of a following axis to a context node.

The term "parent subtree root node" refers to a subtree root node of a parent axis to a context node.

The term "descendant subtree root node" refers to a subtree root node of a descendent axis to a context node.

The term "pointer" refers to any variable that contains an address in memory.

The term "reference" refers to a piece of data that allows retrieval of another piece of data. Examples of references that are useful in the MTreeP2P structure include, but are not limited to, pointers, handles, primary keys, virtual addresses, addresses, IP addresses, network addresses, MAC addresses, memory addresses, globally unique identifiers, identifiers, extensible resource identifiers ("XRI"), uniform resource identifiers ("URI"), uniform resource locators ("URL"), international resource identifier ("IRI"), web service addresses, and the like. Reference is the generalization of pointer as defined above.

The term "null reference" refers to a reference which is empty.

The term "semantic qualified name" as used herein means a source encoded qualified name. In variations, this includes a concept, a linguistically meaningful or symbolic term, or a real world object. The semiotic triangle suggests that the meaning of names is implied and thus query results may have entropy.

The term "server" as used herein means a software agent listener process running on a computer listening and responding to applicable communication events from other servers on the network and from internal node output processes.

The term "semantic" as used herein refers to meaning of words and the relationships of words to their meanings The term "source encoded" means a mapping from a sequence of symbols from an information source to a sequence of alphabet symbols representable with bits. In variations, the source symbols can be exactly recovered from binary bits (lossless source coding) or recovered within some distortion (lossy source coding).

The term "semantic index" as used herein refers to a set of semantic multi-paths maintained in semantic order that are combined into a single overlay network; Semantic index is a synonym for a single semantic version space. An instance of a semantic index will usually be searchable by a query. MTreeP2P allows for multiple semantic named version spaces.

The term "semantic range scan" as used herein means a query that looks for all semantic values that are greater than a specific value, or less than a specific value or between two specific values.

The term "declarative order" as used herein refers to any defined ordering method that can be applied to a path, a set of paths, a node name, a set of node names, an input data element or element set.

The term "semantic order" as used includes declarative order and lexicographic (alphabetic order).

In one embodiment, the present invention provides a data structure that extends the overlay network architecture of the MTree data structure set forth in U.S. patent application Ser. No. 11/233,869 filed on Sep. 22, 2005, the entire disclosure of which is hereby incorporated by reference. The data structure of the present invention is referred to herein as "MTreeP2P." In this embodiment, the MTreeP2P data structure comprises a plurality of index keys for uniquely identifying potential data object context nodes. A data object context node is any context node for which it is convenient to associate a data object to. Examples of data objects that may be indexed with the MTree index structure include, but are not limited to, the data object is an object selected from the group consisting of an XML document, RDF files, music files, movie files, multimedia files, a collection of XML documents, a collection of distributed computers, a distributed service, a collection of distributed services, hierarchical file systems, tree data structures, XML file system, relational database tables, multidimensional tables, computer graphics geometry space, polygon space, and combinations thereof. Each index key is, in turn, associated with one or more potential context nodes. Moreover, the index key has a label that provides semantic content to a user. The MTreeP2P data structure further comprises one or more routing tables associated with each index key. In general, the one or more routing tables comprising a plurality of path references. Typically, the path references are selected from a preceding peer-to-peer graph, a following peer-to-peer graph, an ancestor peer-to-peer graph, and descendent peer-to-peer graph. It should be understood from the definitions for these graphs set forth above, that each of these graphs will define one or more paths. Typically, the index data structure of this embodiment is stored on a digital storage medium. In this embodiment, the MTreeP2P data structure further includes one or more service agents associated with at least one context node.

In a variation of the present embodiment, the one or more routing tables comprise at least 5 path references selected from a preceding peer-to-peer graph, a following peer-to-peer graph, an ancestor peer-to-peer graph, and descendent peer-to-peer graph, wherein the index data structure is stored on a digital storage medium. In another variation of the present embodiment, the one or more routing tables comprising at least 10 path references selected from a preceding peer-to-peer graph, a following peer-to-peer graph, an ancestor peer-to-peer graph, and descendent peer-to-peer graph. In still another variation of the present embodiment, the one or more routing tables comprises one or more of the following: at least 2 path references selected from the preceding peer-to-peer graph; at least 2 path references selected from the following peer-to-peer graph; at least 2 path references selected from the ancestor peer-to-peer graph; and at least 2 path references selected from the descendent peer-to-peer graph. In still another variation of the present embodiment, at least one of the following provisions are present: at least 2 path references are selected from the preceding peer-to-peer graph; at least 2 path references are selected from the following peer-to-peer graph; at least 2 path references are selected from the ancestor peer-to-peer graph; and at least 2 path references are selected from the descendent peer-to-peer graph.

Advantageously, the MTreeP2P data structure is stored on a digital medium. Useful storage media may be volatile or non-volatile. Examples include RAM, hard drives, magnetic tape drives, CD-ROM, DVD, optical drives, and the like.

MTreeP2P is useful as the fabric for a semantic index for P2P routing and querying. MTreeP2P is defined as the composite graph overlay of $f_{p2p}$-graph, $p_{p2p}$-graph, $a_{p2p}$-graph and $d_{p2p}$-graph. MTree is designed to efficiently index XML documents using the XPath and XQuery query languages The threaded path architecture of MTree was selected for routing because the following and preceding axis thread concepts, when enhanced, have desirable P2P routing properties as well as desirable semantic properties MTreeP2P has three primary routing methods that each node can selectively use: RS—single next best hop that is lexicographically an exact match or one cache entry semantically lower than an exact match; RD—double, bifurcation bracketing, send to RS and send to RS+1, the next cache entry semantically one higher than RS; and RB—broadcast, send to more than two entries, potentially all, in the axis cache direction.

In one variation of the present invention, the term node refers to a specific MTreeP2P Web Services protocol listener agent node container process called a server or server container, running on a computer. There can be one or more nodes running in a server container. Nodes communicate with each other by passing messages such as XML messages. Messages contain expiration policies such that they are discarded if they cannot be delivered in the expected time or number of hops. All processing between two nodes is asynchronous XML messages via input-output queues, communicated through servers.

MTreeP2 is a distributed structure graph index which is a composite graph of the union of the $f_{p2p}$-graph, $p_{p2p}$-graph, $a_{p2p}$-graph, and the $d_{p2p}$-graph. MTreeP2P is an adaptation of the MTree index for P2P. To accomplish this, each node in the MTree graph is now interpreted as an addressable P2P network node. Nodes become content addressable when the structure path, from the logical root to the node, is semantically meaningful or contains a semantic topic map. An example of a semantically meaningful topic map for a fact:

/WSU/StateHall/Room600/sensors/temperature/S1

In this example, the XML document root node is replaced with the logical name of the overlay network. This configuration allows named recursive sub-indexes to be linked into arbitrarily deep MTreeP2P indexes. Moreover, the same content and nodes can be indexed one or more times under different semantic paths, allowing for multiple semantic views of the same information, and all paths are queried homogeneously by a modified interpretation of the XPath language. A semantically meaningful hierarchy contains one or more ontologies that start from high level abstractions and step by step become more specific until specific facts or knowledge is encountered at one or more nodes.

With reference to FIG. 1, a schematic illustration of an MTreeP2P example is provided. The dotted lines represent $f_{p2p}$-graph links when pointing to the right and $p_{p2p}$-graph links when pointing to the left. The solid lines represent $a_{p2p}$-graphs when pointing up and $d_{p2p}$-graphs when pointing down. Each node contains one or more references to nodes along the axis path. The original MTree index was designed for XML documents and XML documents are sequentially ordered. MTreeP2P preserves the ordering concept by interpreting the network in lexicographic order of the structure nodes. Thus, a node referenced by a semantic path /g/h/j is inserted into the routing structure to the logical left of path /k/m/o. Since the routing tables are maintained in lexicographic order, searches are efficient, both when accessing local node routing table and when traversing through the network. A set forth above, the insert process is also efficiently accomplished.

One useful feature for P2P architectures, is resiliency. Resiliency in routing is achieved by modifying the singular axis references used in MTree to include multiple partial linear and partial non-linear distance references, called skip-path references, in MTreeP2P. The use of linear steps for nearby nodes and the use of single hop skip-path references to distant nodes enables queries to traverse the network rapidly.

Resiliency is obtained because a node can choose from several next hop destinations should the preferred next hop no longer be available.

Figure 2:
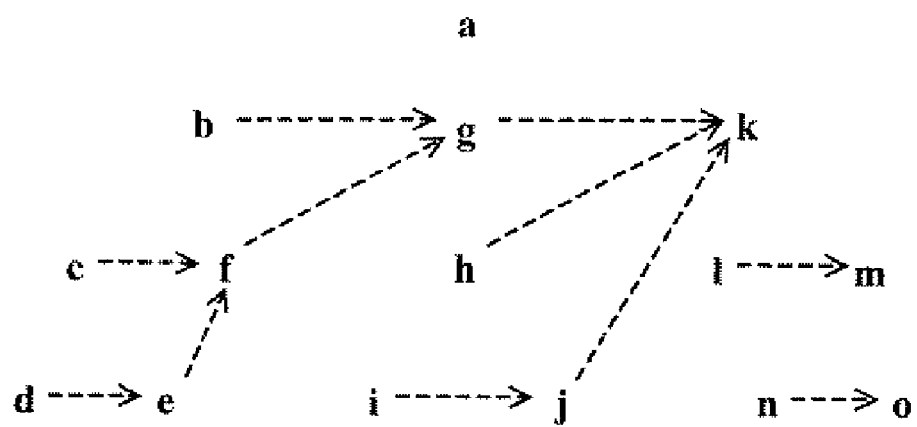
FIG. 2 is MTree f-graph for FIG. 1.
Figure 3:
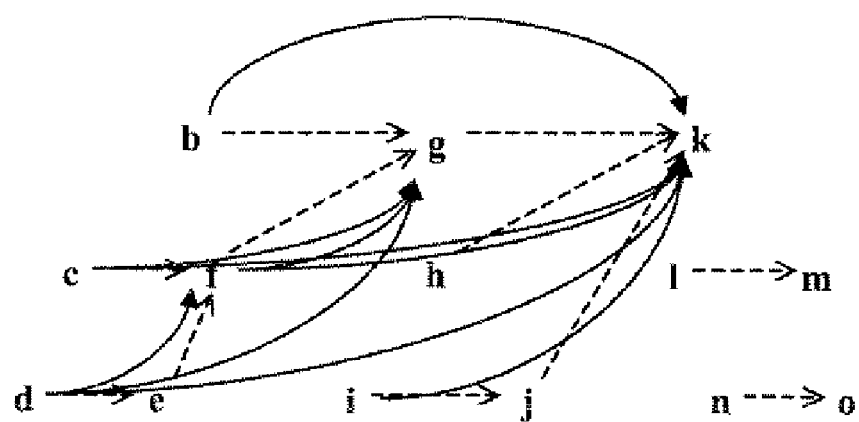
FIG. 3 is a MTreeP2P $f_{p2p}$-graph of FIG. 2.

With reference to FIGS. 2 and 3, illustrations of f-type graphs used in MTree and the present invention are provided. FIG. 2 provides an f-graph axis reference used in MTree. FIG. 3 provides the modified MTreeP2P version fp2p-graph. For comparison purposes, the graph shows dotted and dashed lines, where the dotted lines are the original axis reference and the solid lines are the newly added skip-path references. The graph depicted is small therefore the fp2p-graph axis references shown in FIG. 3 are fully connected. In a very large graph, the nearby routing references can be dense, accessed using a linear distance function, and far routing references are sparse, accessed using a non-linear distance function. The local routing table can be used to quickly find and link to nodes nearest to the target node even when the target node may be located at great Euclidean distances in the tree from the current context node. When the target node is nearby, the target node can be found in one step. The routing table maintains more entries for nodes that are nearby than for nodes that are far away, resulting in high fidelity within local neighborhood subtree clusters.

Figure 4:
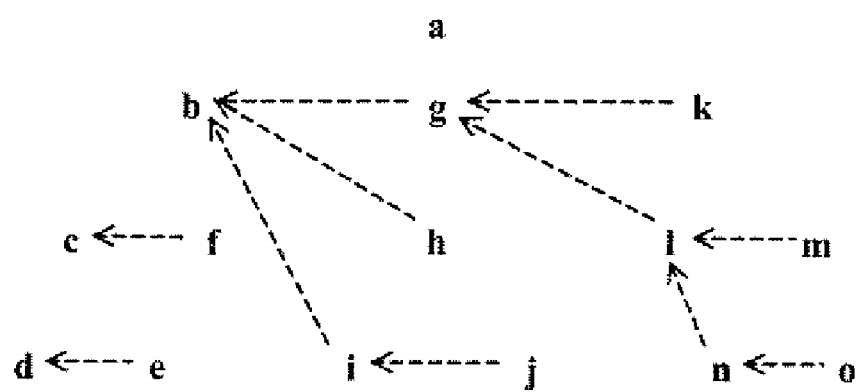
FIG. 4 is MTree p-graph for FIG. 1.
Figure 5:
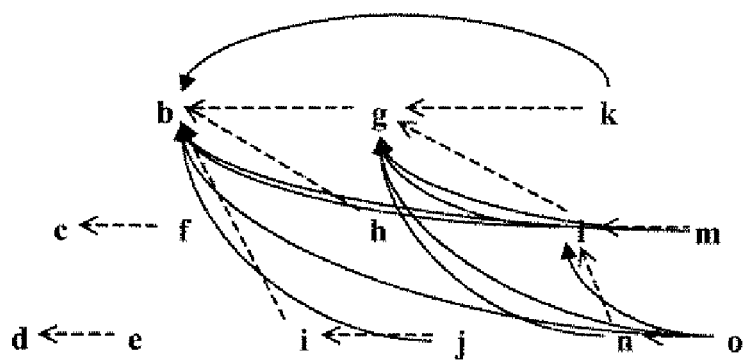
FIG. 5 is a MTreeP2P $p_{p2p}$-graph of FIG. 4.

With reference to FIGS. 4 and 5, illustrations of p-type graphs used in MTree and the present invention are provided. FIG. 4 provides the p-graph axis of the MTree data structure. This p-graph is the inverse of the f-graph 4. FIG. 5 provides the fully connected MTreeP2P p-graph axis. The following and preceding axis lists can be extended further, to provide additional structure redundancy, by adding additional entries for the descendents and ancestors of the nodes in the following and preceding axis.

A B+Tree is a commonly used index data tree structure that is "height balanced". A height balanced tree structure maintains an equal path length from the root node to every leaf node for all paths, despite the insertion of new nodes or the deletion of old nodes. Many other tree structures are designed to maintain height balance. The focus on balanced structures has been to ensure that the cost for input-output operations done on a disk, when navigating the index from the root node to a specific leaf node, is the same for all leaf nodes, Many other P2P networks that adapt equivalent tree structures, such as AVL trees, are also designed to maintain a height balanced node structure. When a height balanced tree structure is adapted to a P2P network queries do not navigate by always starting from the root node, but queries can be initiated from any node to any node; thus the need for height balancing from a single root node to all leaf nodes diminishes. In contrast, MTreeP2P does not attempt to retain height balancing of the tree structure and MTreeP2P allows for a plurality of root nodes. MTreeP2P enables sideways linking in a non-height balanced tree. MTreeP2P embodies some concepts from suffix trees in the way semantic paths are used. To enable fast message routing times, MTreeP2P relies on the semantic ordering properties inherent in the semantic paths to locate nodes when the paths are placed into the MTreeP2P index, whereby the ordering property is enforced in each routing table on every node.

Figure 6:
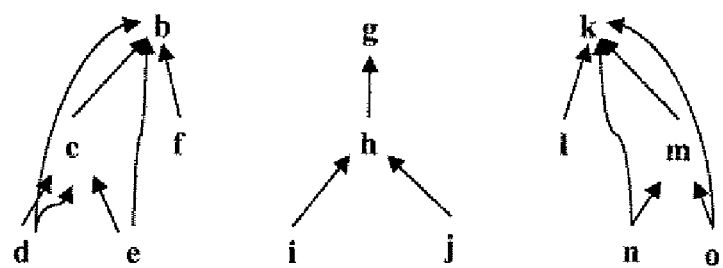
FIG. 6 is a MTreeP2P Redundant ap2p-graph for FIG. 1.
Figure 7:
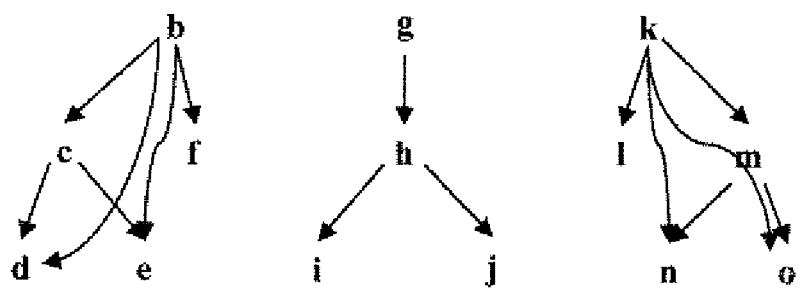
FIG. 7 is a MTreeP2P Redundant dp2p-graph FIG. 1.

MTree is not height balanced and no attempt is made to height balance MTreeP2P. In P2P networks, height balancing is less relevant. Communications between nodes are redundant and overlapped to obtain resiliency. Each of the axis lists of consecutive nodes overlap with each other and thus form a mesh that is the basis for the strength and resiliency of the network, much like a spider web or rope that has many strands of small interconnecting fibers. It can be observed that node coverage is not balanced. One redundancy measure for a context node is a function of the number of nodes that either point directly to the context node or point directly to a node that points to the context node. Those nodes in the center of the tree have more redundancy than those nodes at the edges. Redundancy also exists with the ancestor and descendent axis. The ancestor and descendent graphs are shown in FIG. 6 and FIG. 7.

The flexible nature of the MTreeP2P structure allows for any hierarchical semantic topology to be created. Although these graphs show each node uniquely defined within the MTreeP2P graph, networked nodes can insert themselves into multiple locations in the routing structure by using different semantic paths, based on the desired semantics the node wishes to be associated with. A node can uniquely provide content for very different topics or can provide the same content to several different topics. Each local content container starts with an MTree subtree root node, which can reference other virtual or real nodes or a distributed hash table ("DHT"), addressable nodes within the MTreeP2P network, or the subtree root node can be mapped to local node MTree indexes that index data structures such as documents, file directories, files, XML documents, other MTree indexed XML documents, databases, web services, or any other data object or data structure that the node wishes to expose to the MTree P2P network. It is this recursive application of MTree, first to the nodes on the network, then within each node to any data object, and finally to the instance data itself, that provides MTreeP2P with the ability to index the entire computing space.

One or more MTreeP2P nodes are managed and supported by a service. The service has a network interface for communicating with other services on other computers. Services, upon receipt of an inbound message from the network, route the messages locally to the appropriate receipt of an inbound message from the network, route the messages locally to the appropriate node. Services communicate outbound messages from nodes to the appropriate services on other distributed computers. The routing tables, for each routing table entry, maintain the service address, the semantic path, and other metrics such as the last contact time, message counters and latency to that node. When a message is constructed the service address that corresponds to the target semantic path is placed in the message header by the sending node; then the local service uses the service address to connect to the remote service and sends the message.

Figure 8:
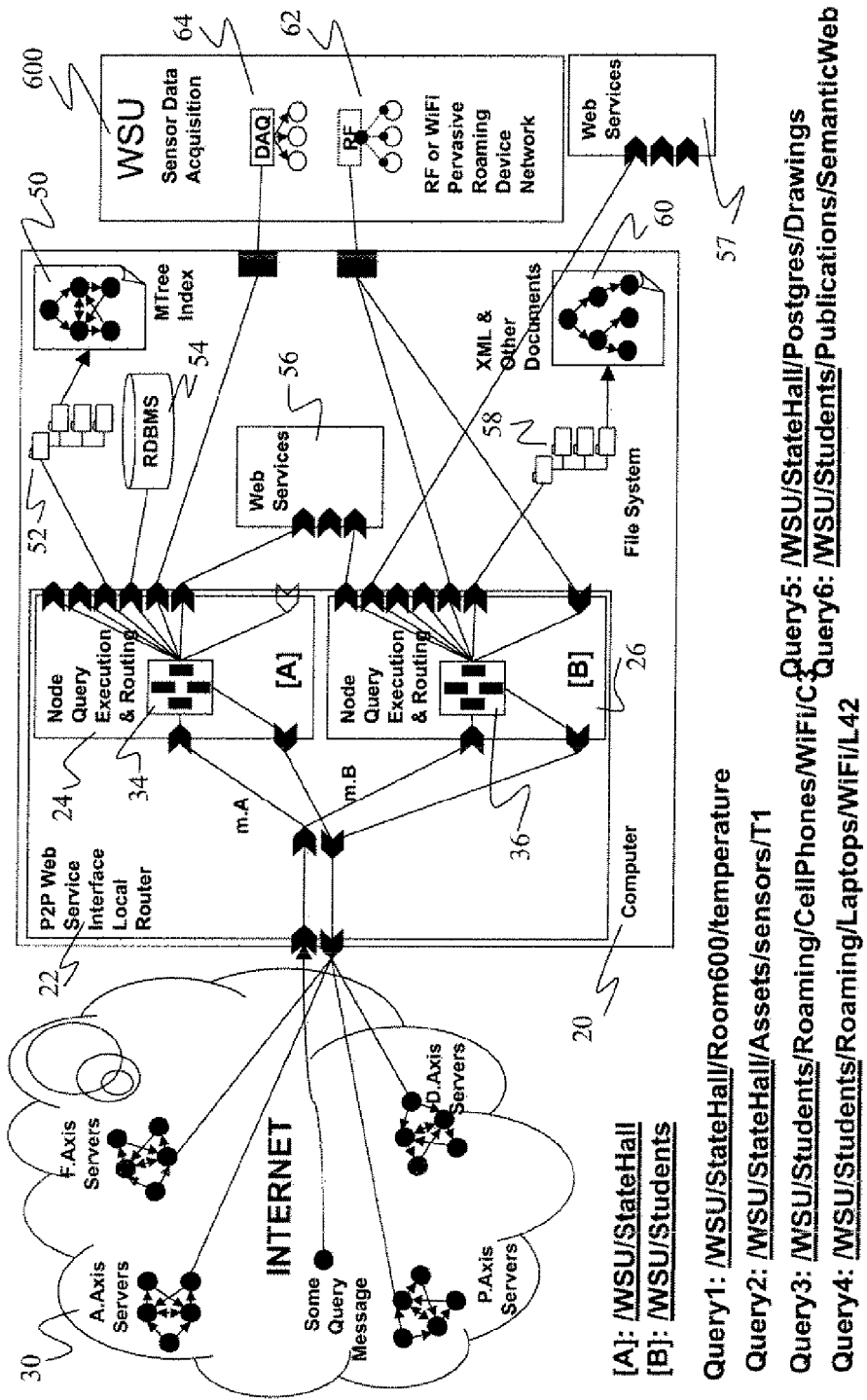
FIG. 8 is a schematic illustration of an MTreeP2P implementation example.

With reference to FIG. 8, a schematic illustration of an MTreeP2P example is provided. In this example, a computer integrates disparate data objects into the MTreeP2P index. Computer 20 includes service interface 22 in communication with nodes 24, 26. Service interface 22 also communicates with service interfaces on other computers that are integrated in the MTree P2P index and is a container for nodes 24 and 26. This is schematically depicted in FIG. 8 as Internet 30. Nodes 24, 26 include routing table 34, 36 which provide routing information to adapter ports connecting to disparate data objects 50-64. In particular, in this example, temperature sensors 64 are data objects. In this example, sensors 64 are located in room 600.

In another embodiment of the present invention, a method for constructing the MTreeP2P index structures set forth above is provided. Typically, the MTreeP2P index structures are created by the execution of a creation programs one or more computer systems with the index being stored as set forth above. Examples of such computer systems include, but are not limited to, mainframe computer systems, distributed computer systems, grid computer systems, cluster computer systems, microprocessor-based systems, and the like. The MTreeP2P index structure can be created in a number of ways, depending on the intended usage and intended audience. Examples of such creation methods include bottom-up methods, top-down methods, and hybrid methods. A bottom-up construction is organic, allowing each node to define and select the semantic topology it wishes to expose. Bottom-up networks are ad-hoc, but they reflect the commons viewpoint. Top-down construction requires a governance body to define and manage the semantic topic structure that the network should use. An XSD, XML schema definition, can be used to define the MTreeP2P structure or version space. For example, a top down index may create, at the highest contextual level, the top level nodes: /who, /what, /where, /how, /when and /why. Lastly, a hybrid uses the best of both, a top down meta-structure with nodes providing the detailed structure for the specific data objects exposed. Large organizations may prefer to use a managed structure so that information can be topologically organized in a meaningful way, using an architecture framework, such that relevant information can be quickly added and easily found. An example, suppose a node is a network aware multifunction environmental sensor node and the node wants to be located in the MTreeP2P in two places, one a geographic location and another, an asset inventory location. The sensor node, S2, can insert itself into the geographic location path, by requesting the path:

/WSU/StateHall/Room600/sensors/S2

The node can also separately register itself in the asset inventory by issuing an insert request into path:

/WSU/asset/inventory/sensors/S2

Lastly, the sensor may wish to expose real-time measurement values, such as temperature and humidity to an MTreeP2P query. The real-time sensor values can be retrieved with an XPath query such as this:

/WSU/StateHall/Room600/sensors/S2//

This query returns nodes: temperature and humidity An example of how a file might be mapped:

/WSU/hostname/filesystem/c:/notes/java/file.xml

For both methods, all that is needed to insert a node is the name of the MTreeP2P network and one active node already within the network. A node first issues an insert request to the MTreeP2P network. The network first attempts to resolve the location using equality match on the network path portion of the XPath query. If an equality match occurs, the nodes that match the path are returned to the new node. The new node selects one of them, called the supporting node, usually the node with the lowest latency, and issues the request to be inserted, either preceding the supporting node or following the supporting node. If an equality match does not occur then the nodes that can identify where the new node should be located, via a bracketing method executed on the routing cache, the bracket is returned to the new node. The new node will receive several bracketing suggestions for the new node. The new node selects the supporting node for the correct location and issues a request to the supporting node to be inserted.

The supporting node provides the new node with its axis routing tables and updates its own routing tables by placing the new node in the appropriate axis list. The new node uses the routing table copy to inform the next node in the axis in the direction opposite to the supporting node that it has been inserted. Once this is done, the node is locatable in the network. The new node then issues path update control messages on each axis so that it can update its own routing tables with the topology and so that it can notify other nodes to update their routing table references to the new node. No additional effort is needed to place the node correctly, even under changing conditions, thus over a short period of time every node will correctly position itself relative to its neighbors. Since large portions of the routing tables are shared, nodes quickly become knowledgeable about the network.

Figure 9A:
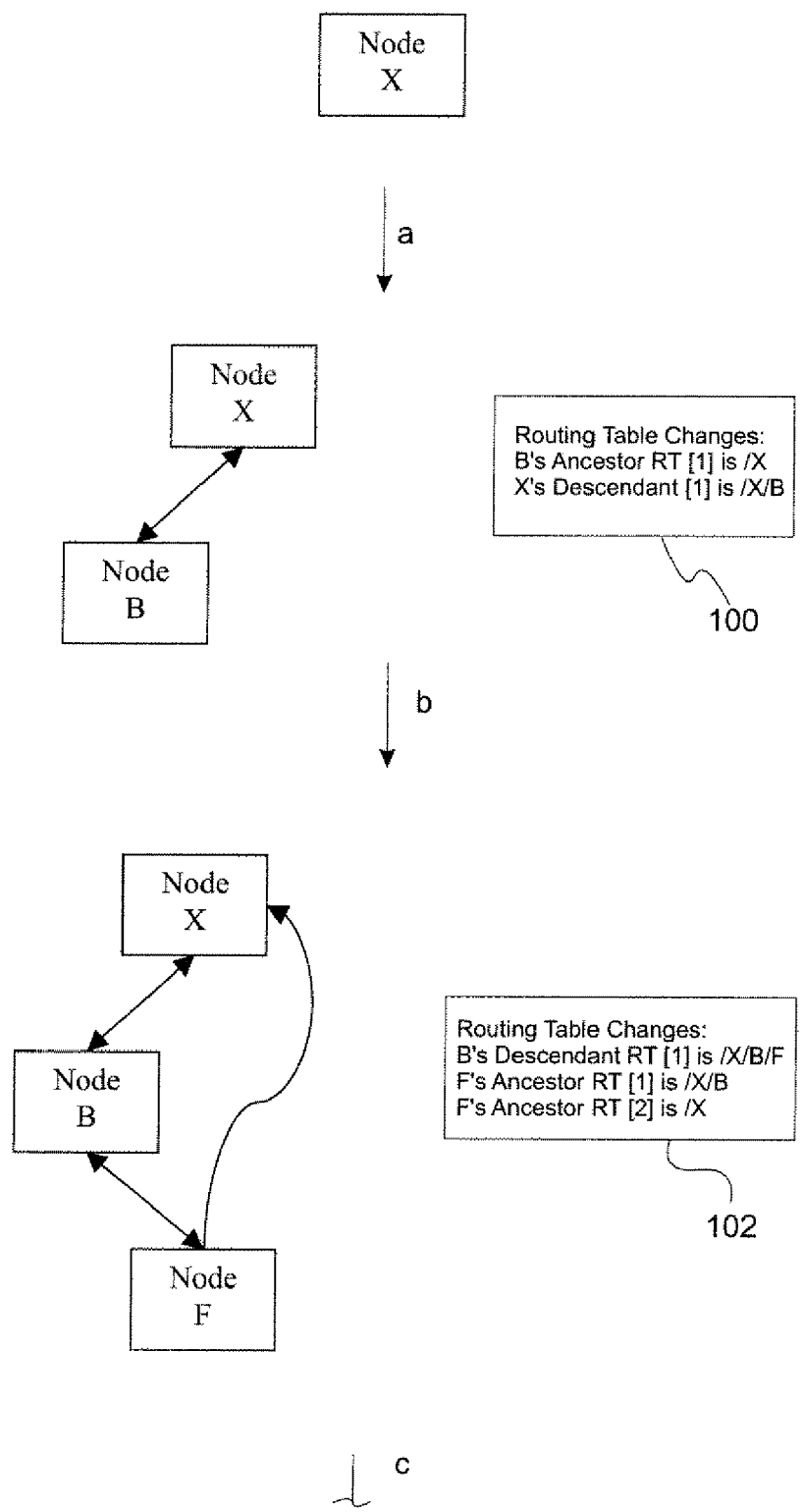
FIG. 9A is a diagram showing the construction of a MTreeP2P index.
Figure 9B:
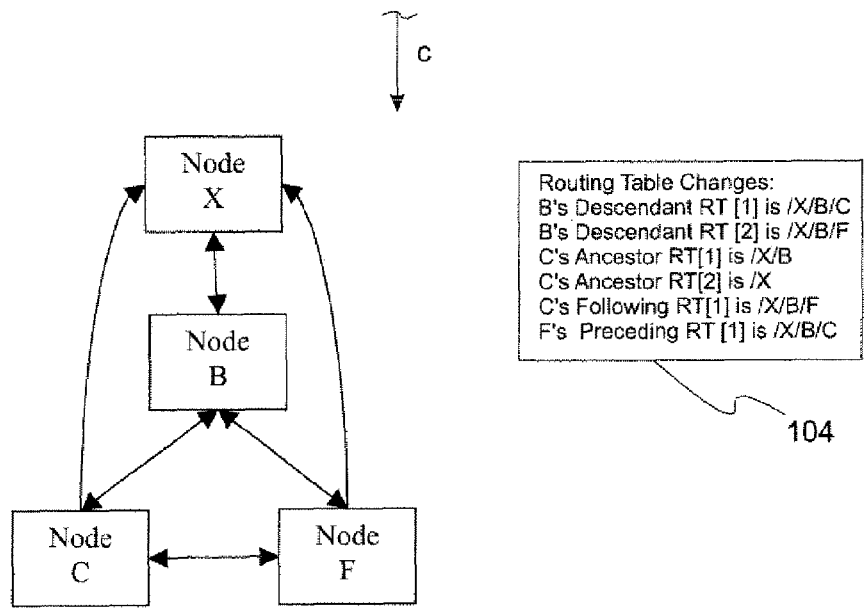
FIG. 9B is a continuation of FIG. 9A.
Figure 9B:
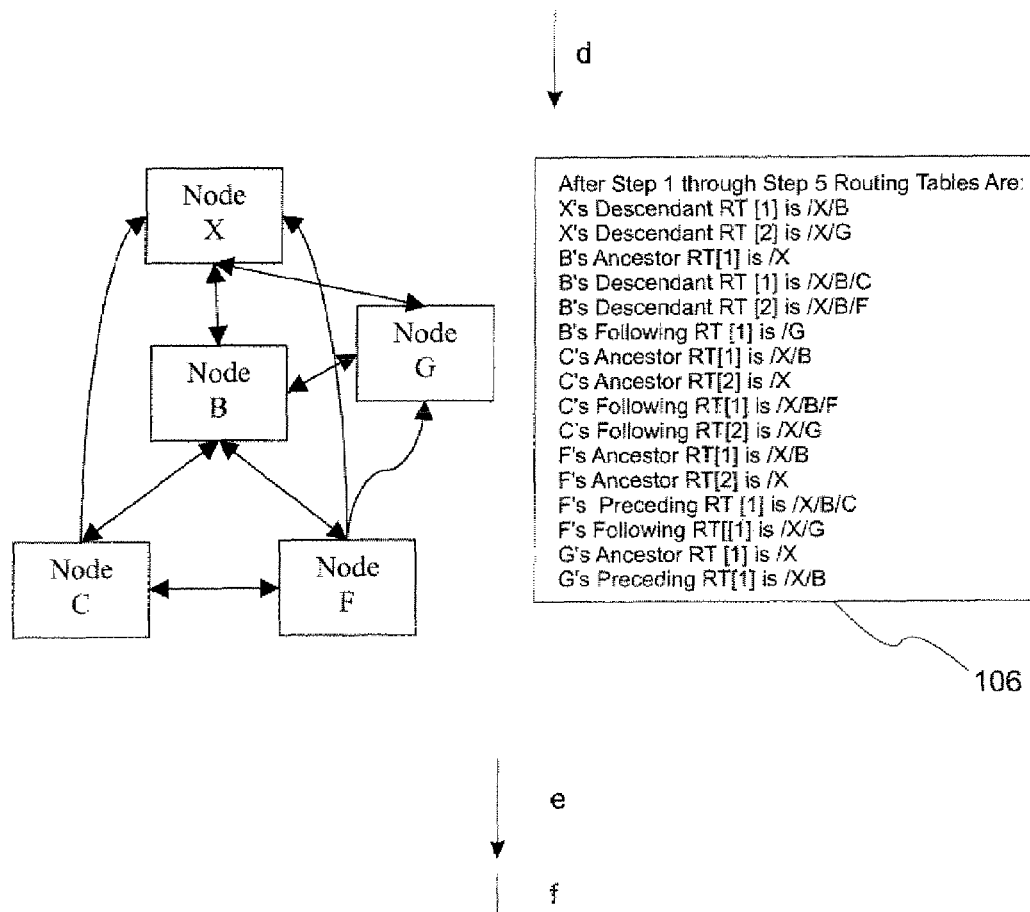

With reference to FIGS. 9A, 9B, and 9C, a diagram showing the construction of a MTreeP2P index is provided. Initially node X starts up a MTreeP2P network. In step a), node B joins the network by requesting to locate on semantic path /X/B and attaching itself on path /X/B. Item 100 provides changes made to the routing tables. In step b), node F joins the network by requesting to locate the node at semantic path /X/B/F and attaching itself on path /X/B/F. Item 102 provides the routing table changes after this step. In step c), Node C joins the network by requesting to locate the node on semantic path /X/B/C. Node C attaches itself to node B on path /X/B/C. Item 104 provides changes made to the routing tables. In step d), Node G joins network by requesting to locate the node on semantic path /X/G and attaching itself to node X on path /X/G. Item 106 provides the routing table after steps a)-d). After many steps as illustrated by multi-step designation e), f) etc. a tree structure is formed. Item 108 provides the routing table for this tree structure.

Figure 10:
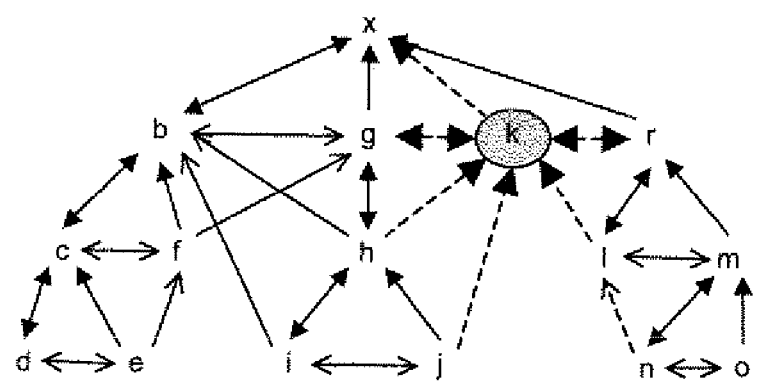
FIG. 10 is a schematic illustration showing the insert of node k into tree shown in FIG. 1.
Figure 11:
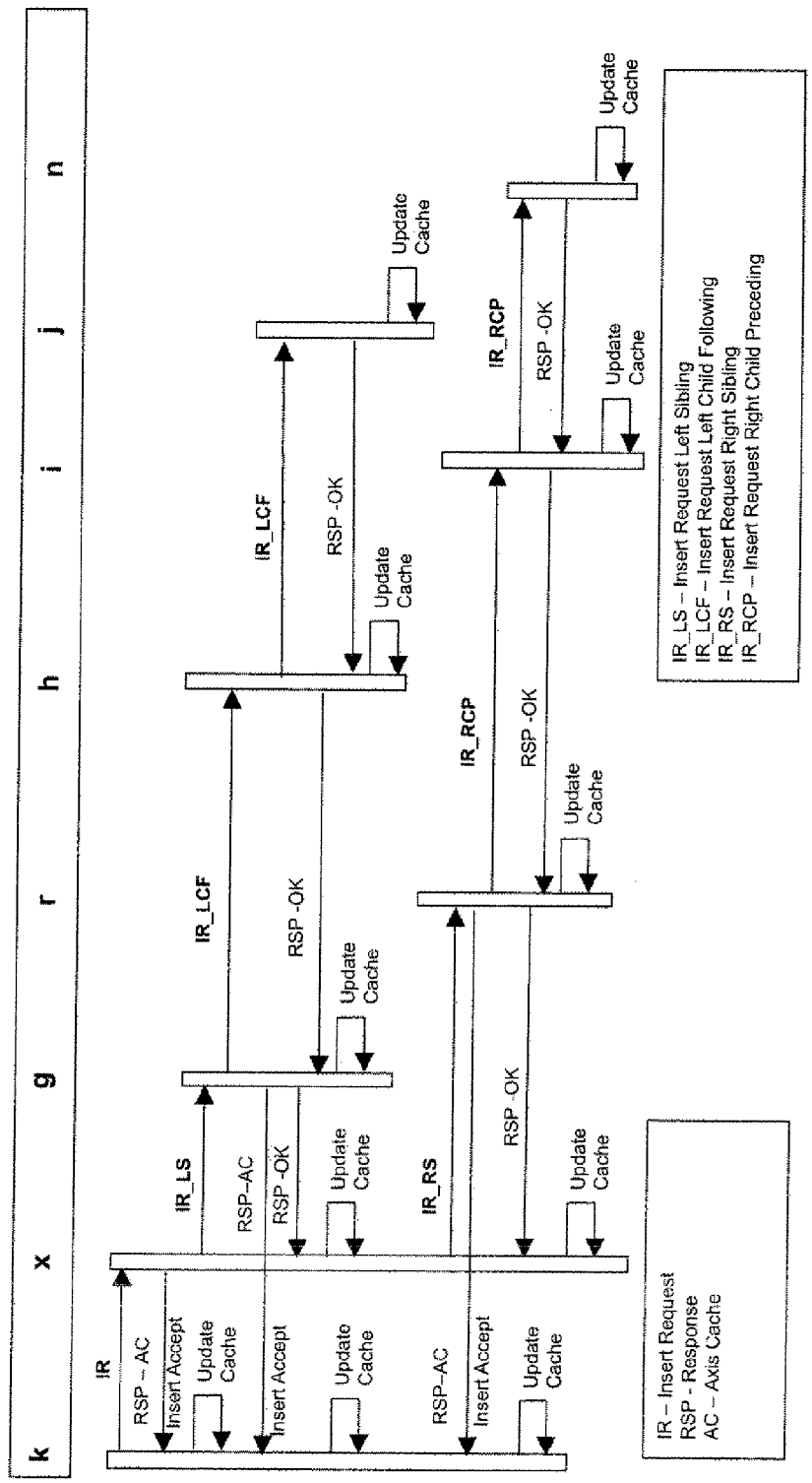
FIG. 11 is an illustration showing the insert sequence diagram for insert of node K, as shown in FIG. 9.

With reference to FIGS. 10 and 11, diagrams illustrating the node insertion process into an MTreeP2P index are provided. An attachment point node is selected using XPath to query the network e.g.: "/x". This attachment point becomes coordinator/decider for insertion of node k into the network. The sequence for attachment follows:

"x" decides it owns "k"
"x" selects where to attach "k"
"x" passes copy of routing tables to "k"
"x" informs "g" that "k" is following
"x" informs "r" that "k" is preceding
"g" informs "h" that "k" is following
"r" informs "l" that "k" is preceding
"h" informs "j" that "k" is following
"l" informs "n" that "k" is preceding
"g" sends preceding and following axis caches to "k"
"r" sends preceding and following axis caches to "k"
"k" issues repair messages for each axis direction Recursively descend until no more first children or last children Nodes can leave the network by first notifying the neighborhood by placing a request to leave message on each axis. The neighbors can update their routing tables by removing the axis references to the node. Alternatively, the verification and query process is robust enough that a node can merely disappear from the network. The next query seeking this node will observe that it is gone and use an alternative path and potentially trigger the verification process. If the network is experiencing sparse utilization then the normal verification process will correct the structure.

Nodes frequently join and leave the network. Resiliency and correctness of the network structure is advantageously ensured. The network structure is maintained by control messages that nodes issue on various axis to test the efficacy of their routing table entries. When query activity is high, the query message itself is used as a control message to partially validate the structure. When a node does not see any query messages for a period of time, a timeout occurs, and the node attempts to test the axis references from the routing tables by issuing control messages that traverse each axis path. Nodes use control messages to exchange routing tables with each other. Due to redundancy of information in the routing tables, only a few messages need to be exchange for a new node to have significant routing capability. Under dynamic conditions, the MTreeP2P network will maintain a load on the network for routing structure testing and maintenance. This load is minimal, even for large networks.

In another embodiment of the invention, a method of querying the MTreeP2P index structre set forth above is provided. The steps of the method of this embodiment are executed by a computer processor with the MTreeP2P index being present in volatile memory, non-volatile memory or a combination of both volatile and non-volatile memory. Examples of useful computer systems for performing queries include, but are not limited to, mainframe computer systems, distributed computer systems, grid computer systems, cluster computer systems, microprocessor-based systems, and the like. In particular, the method of the invention is executed by network attached microprocessor based systems. The computer implemented method of this embodiment comprise receiving a query message from network, routing the message, parsing a query into elementary steps, executing the elementary steps on the data object, and returning results of the query on the network. Query messages can contain input parameters and can execute against data objects to perform data manipulation operations such as create, read, update and delete. Typically, a query is initially executed at one or more MTreeP2P context nodes. If the context node is unable to properly analyze the query or if the context nodes routing table suggest other nodes might be more suited to respond to the query, this initial context node forwards the query to one or more receiving nodes found in the routing node (nodes that may be better suited for provide a query answer). The forwarding is initiated by the initial context node which is now a requesting node. The receiving nodes subsequently return the query results to the requesting node. In one variation, the one or more receiving node are determined to be relevant based the routing table. In another variation, the one or more receiving node are determined to be relevant based a semantic ordering.

Figure 12:
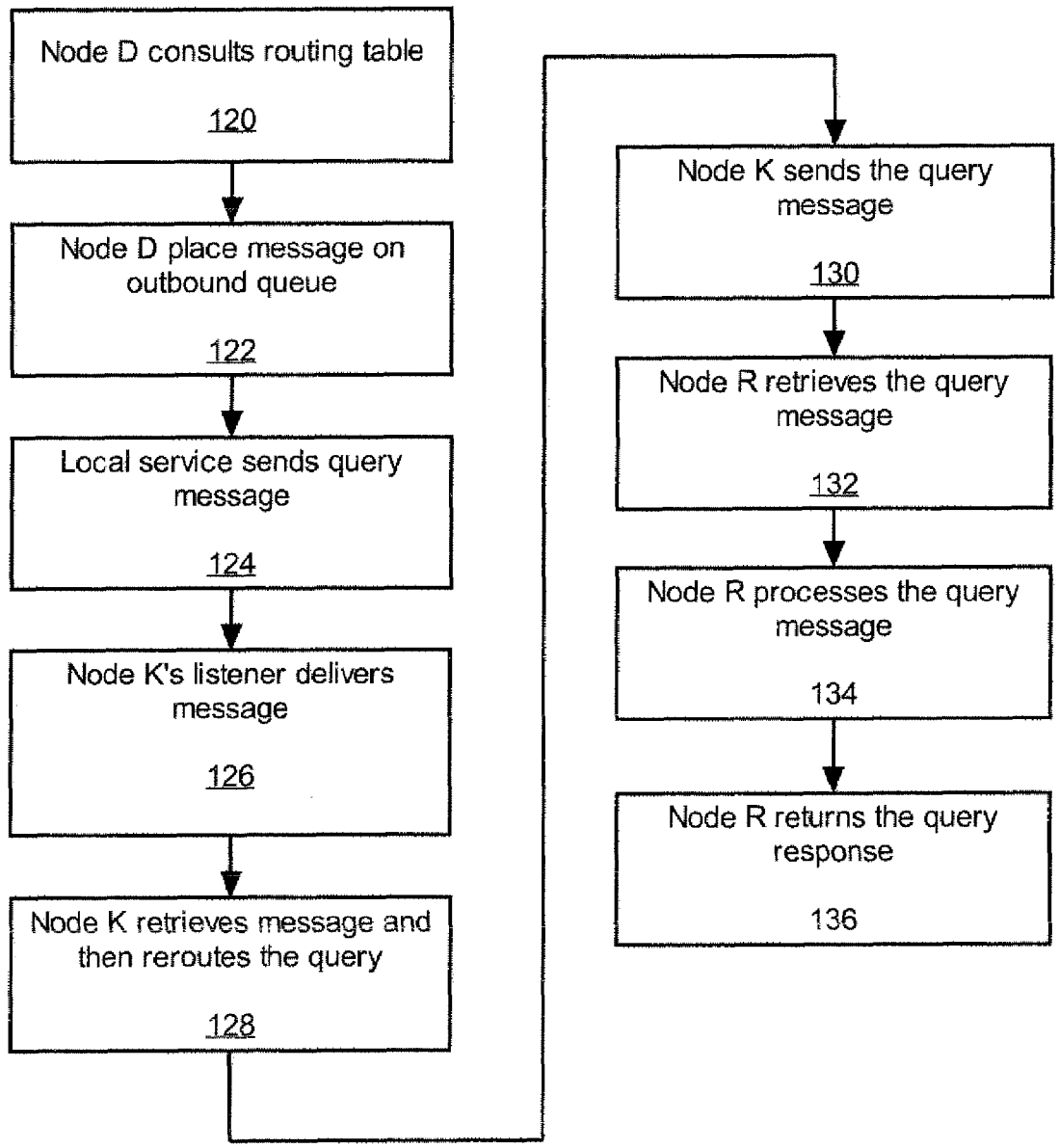
FIG. 12 is a flowchart illustrating a query process.

With reference to FIG. 12, a flowchart illustrating the query process is provided. In Box 120, Node D issues query "/X/R" and, therefore, consults the local routing table and determines that the next best node to forward the query to is /X/K, routing table entry D.Following[3], since /X/R is semantically greater than /X/K. Next, Node D places the message on the outbound queue, which is picked up by Node D's local service (Box 122). Node D's local service then sends the query message "/X/R" directly hopping to the service listener for node /X/K (Box 124). Node K's listener service delivers the message to Node K's inbound queue as depicted in Box 126. In the next step (Box 128), Node K retrieves the query message from the inbound queue, determines that the query cannot be resolved locally, and routes the message to the next best node from the local routing table entry K.Following[1]. K.Following[1] happens to be the target node /X/R. The routing of the message occurs by placing the message into Node K's outbound queue, which is picked up by Node K's service. In Box 130, Node K's local service sends the query message "/X/R" directly hopping to the service listener for node /X/R. Node R's listener service delivers the message to Node R's inbound queue (Box 132). Node R retrieves the query message from the inbound queue, processes the query request and updates the local data objects if necessary and sends back the requested information back to node D by placing the message into the outbound queue with D's reply to address (Box 134). Finally in Box 136, Node R's local service sends the query response message directly back to the service listener for node D.

In variations of the present embodiment, the XPath or the XQuery query languages are used for querying. Further refinements extend the execution semantics of XPath to the MTreeP2P overlay network to support all queries, including range queries, branching path queries and exact match queries. XPath was selected because path expressions are used to locate nodes within trees and thus can be used to navigate a network. A path expression consists of a series of one or more location steps, separated by "/" or "//". The double vertical lines ("||") refer to the string concatenation operator. In a variation, the present embodiment extends the XPath query to contain multiple parts:

XPathP2P=netExpr||nodeExpr||PathExpr wherein:
  netExpr=network routing expression part
  nodeExpr=node routing expression part
  pathExpr=XPath expression part The netExpr part is mapped to the hierarchical semantic topic map. The nodeExpr part is mapped on the node typically to a named method in a Web Service WSDL, equivalent to the SOAP action, whereby the service name is inline in the path /serviceName/. The pathExpr part is the XPath that is executed against the object that is located on the node or passed into the Web Service method for execution. Using our previous example, suppose the following XPath query fragment:

/WSU/StateHall/Room600/sensors/S2/temperature

The network routing query part is "/WSU/StateHall/Room600/sensors/S2" and enables the XPath query message to be routed to sensor S2. The node routing query part. "S2/temperature" requests node S2 to return the subtree attached to the temperature location step. Since temperature, in this application is not an XML document nor a qualified name within an XML document, but temperature is a real-time measured sensor value, the regular XPath query part is interpreted to be the current temperature measurement located at node S2. The node S2 returns the current temperature reading from the sensor in the query response formatted in an XML snippet: <temperature measure='F'>70</temperature>.

The regular XPath query part uses the current XPath specification when applied to an XML document instances, otherwise it is interpreted as the application of XPath to the local data structure being queried. The node routing query part is executed by the node agent to determine what data structure on the local node should process the regular XPath query part. Lastly, the network routing query part is the portion of the XPath that is interpreted by the nodes in the context of the MTreeP2P routing mesh.

In a refinement of the present invention, the XPath semantics that do not fit well in dynamic P2P architectures are adjusted. One example is document ordering. In the XML model document order is defined as stable, which means that the relative order of any two nodes will not change during the processing of a given query, but due to the dynamic nature of MTreeP2P, with nodes leaving and arriving at any time, the relative semantic or lexicographic order of the structure is point-in-time dependent. For MTreeP2P, "stable" is redefined to be "resilient" and it means a best-effort point-in-time query response.

In still other refinements of the invention the ordering semantics for the MTreeP2P network are changed further. It is desirable to maintain some form of ordering. With XML documents, the schema definition or XML instance document determine the actual node ordering and the document ordering can change for each application and can be in non-lexicographic or non-semantic order. MTreeP2P supports XML ordering for the regular XPath query part. For the network routing query part and for the node routing query part, MTreeP2P uses the semantic ordering of semantic paths enforced in the routing table. The semantic ordering is leveraged to substantially reduce the query search space, using well-known search algorithms on the axis lists, such as binary search, and thus provides the necessary performance optimization and redundancy to enable O(ln n) routing and better than O(lg n) when routing paths are traversed in parallel by sending RD and RB cloned redundant messages using MTreeP2P axis threads.

Nodes respond to queries using best effort. When multiple nodes are able to respond to a query, the node issuing the query will need to filter out duplicates and order the responses in lexicographic or semantic order prior to returning the sequence to the query processor. Nodes on various query paths may also receive duplicate messages for the same query. Redundant messaging is a desirable property to provide query resiliency, thus a node maintains a local cache that checks the GUID, a globally unique identifier that is unique in time and space, of the query message to determine if it has already processed it. If it has, the node discards the message. Thus a node only processes a specific query once. This is a necessary check to bound the message to O(n) nodes, preventing uncontrolled exponential growth message storms that would otherwise occur.

Although each node attempts to respond once to any query, unique responses are not guaranteed. Therefore, responses also have a GUID that is used by the node generating the query. The GUID is used both by the node receiving the query to test for duplicates. The node generating the query also tests for and eliminates duplicate responses based on the node identifier on the responding message. Thus query can return a response multiple times within one or more contexts. When the context path is the same for the same nodes then duplicate nodes are eliminated and when the context paths is not a duplicate or the nodes are unique, the results are composed into one answer by the node issuing the query.

When a node receives a query that it determines it cannot satisfy, the node forwards the message to the next best routing entry. The node determines if the message network routing query part is greater than or less than itself, in semantic order, and selects the appropriate axis, such as preceding or following. For example, it the query is for a location step qualified name="r", and the current node is "a", the following axis routing list is selected. Suppose the following axis routing list contains the entries {b, c, e, h, m, q, v, z}. The list is range searched and nodes "q" and "v" are identified as bracketing the search area so the query is forwarded to node "q", and node "v", directly, when the bifurcation mode is enabled. The nodes "q" and "v" will now forward message copies of the query to their best next hop routing selections, in parallel. Thus, message will likely arrive at the destination node on the path having the shortest latency. The target node will receive redundant queries, but it will only respond to the first unique query message received and discard the duplicates, identified by the query GUID value.

Most disparate data objects will not be able to support the complete semantics of the XPath and XQuery languages. When query constructs are used that are not supported by the data object or cannot be mapped to the data object in a meaningful way the data object will return an empty response.

The node can either send back a response message by using an inverse path message or by connecting directly to the node that initiated the query. If anonymity is desired then using the inverse path will hide the query initiator's identity.

The theoretical performance measurement yields good results. Suppose 1000 nodes, therefore we have 1,000 parallel CPUs*1,000 ms/sec=1,000,000 CPUms/sec of CPU processing available. Each query needs 10 hops to resolve via routing, assuming a 10 CPU ms routing cost and assuming 50 CPU ms per query cost at the destination. Therefore, each query has a cost 10*10+50=150 CPU ms total cost, assuming zero latency. Suppose axis repairs send one message per cache entry every 10 CPUms, 6 messages/sec, yields an amortized cost of 10*6*1000 servers=60,000 CPUms/sec of server capacity. Total capacity 1,000,000 CPUms –axis repair consumption of 60,000 CPUms yields 940,000 CPUms remaining capacity available for query processing: 940,000 CPUms/150 CPUms query cost=6266 queries/sec.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer implemented method of querying an index data structure for one or more data objects, the index data structure comprising:

a) a plurality of index keys for uniquely identifying potential data object context nodes, each index key being associated with a context node, at least one index key having a label that provides semantic content to a user; and b) one or more routing tables associated with each index key, the one or more routing tables comprising at least 5 path references selected from a preceding peer-to-peer graph, a following peer-to-peer graph, an ancestor peer-to-peer graph, and descendent peer-to-peer graph, wherein the index data structure is stored on a digital storage medium, the method comprising the following steps that are implemented by a computer processor:

parsing a query into elementary steps;

executing the elementary steps on the index data structure; and returning results of the query.

2. The method of claim 1 further comprising forwarding the query to one or more receiving nodes, the forwarding being initiated by a requesting node.

3. The method of claim 2 further comprising returning queries results from the one or more receiving nodes to the requesting node.

4. The method of claim 2 wherein the one or more receiving nodes are determined to be relevant based on the routing table.

5. The method of claim 2 wherein the one or more receiving nodes are determined to be relevant based on a semantic ordering.

6. The method of claim 2 wherein the query is in the XPath or XQuery language.

7. The method of claim 1 wherein the semantic content is a path to the node associated with the index key.

8. The method of claim 1 wherein a single node is associated with one or more semantic paths.

9. The method of claim 1 wherein the one or more routing tables comprises at least 10 path references.

10. The method of claim 1 wherein the one or more routing tables comprises:

at least 2 path references selected from the preceding peer-to-peer graph; at least 2 path references selected from the following peer-to-peer graph; at least 2 path references selected from the ancestor peer-to-peer graph; and at least 2 path references selected from the descendent peer-to-peer graph.

11. The method of claim 1 wherein at least one data object is an object selected from the group consisting of a peer-to-peer network, an XML document, RDF files, music files, movie files, multimedia files, a collection of XML documents, a collection of distributed computers, a distributed service, a collection of distributed services, hierarchical file systems, tree data structures, XML file systems, relational database tables, multidimensional tables, computer graphics geometry space, polygon space, and combinations thereof.

12. The method of claim 1 wherein at least one data object is a peer-to-peer network.

* * * * *

UNITED STATES PATENT AND TRADEMARK OFFICE
CERTIFICATE OF CORRECTION

PATENT NO. : 7,664,742 B2
APPLICATION NO. : 11/559887
DATED : February 16, 2010
INVENTOR(S) : Primo M. Pettovello It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this

Fourth Day of January, 2011

David J. Kappos
*Director of the United States Patent and Trademark Office*